United States Patent
Wang et al.

(10) Patent No.: US 12,143,344 B2
(45) Date of Patent: Nov. 12, 2024

(54) AUTOMATICALLY PROCESSING USER REQUEST DATA USING ARTIFICIAL INTELLIGENCE TECHNIQUES

(71) Applicant: Dell Products L.P., Round Rock, TX (US)

(72) Inventors: Zijia Wang, Weifang (CN); Zhisong Liu, Shenzhen (CN); Zhen Jia, Shanghai (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 17/947,358

(22) Filed: Sep. 19, 2022

(65) Prior Publication Data

US 2024/0106766 A1 Mar. 28, 2024

(51) Int. Cl.
*H04L 51/02* (2022.01)
*H04L 41/026* (2022.01)

(52) U.S. Cl.
CPC ............ *H04L 51/02* (2013.01); *H04L 41/026* (2013.01)

(58) Field of Classification Search
CPC .............................. H04L 51/02; H04L 41/026
See application file for complete search history.

(56) References Cited

U.S. PATENT DOCUMENTS

| 11,005,997 | B1 * | 5/2021 | Deegan | .................. H04L 51/02 |
| 11,676,044 | B1 * | 6/2023 | Mazza | .................. G06N 5/041 |
| | | | | 706/11 |
| 2022/0247700 | A1 * | 8/2022 | Bhardwaj | .............. G06N 3/044 |
| 2022/0414477 | A1 * | 12/2022 | Picco | ..................... G06N 5/013 |
| 2023/0379273 | A1 * | 11/2023 | Yannam | ........... H04M 1/72436 |

OTHER PUBLICATIONS

Xu et al., "A New Chatbot for Customer Service on Social Media," in Proceedings of the 2017 CHI Conference on Human Factors in Computing Systems: CHI '17. Denver, Colorado, USA: Association for Computing Machinery, 2017, pp. 3506-3510.

(Continued)

*Primary Examiner* — Suraj M Joshi
(74) *Attorney, Agent, or Firm* — Ryan, Mason & Lewis, LLP

(57) ABSTRACT

Methods, apparatus, and processor-readable storage media for automatically processing user request data using artificial intelligence techniques are provided herein. An example computer-implemented method includes generating, using a chatbot during a communication session with a user, answers to user requests by processing the user requests using a first set of artificial intelligence techniques associated with the chatbot; generating knowledge base-related predictions associated with the user requests by processing the user requests using a second set of artificial intelligence techniques associated with a knowledge base; calculating at least one score associated with at least a portion of the answers and the user requests based on qualifying values computed in connection with at least one of generating the answers and generating the knowledge base-related predictions; and performing one or more automated actions based on the at least one calculated score.

20 Claims, 6 Drawing Sheets

(56) References Cited

OTHER PUBLICATIONS

Lundberg et al., "A unified approach to interpreting model predictions," in Advances in neural information processing systems: 30 (2017).

Jethani et al., "FastSHAP: Real-time shapley value estimation," in International Conference on Learning Representations, Jul. 15, 2021.

Covert et al., "Improving KernelSHAP: Practical Shapley Value Estimation Using Linear Regression," Proceedings of The 24th International Conference on Artificial Intelligence and Statistics, PMLR 130:3457-3465, Apr. 2021.

* cited by examiner

AUTOMATICALLY PROCESSING USER REQUEST DATA USING ARTIFICIAL INTELLIGENCE TECHNIQUES

FIELD

The field relates generally to information processing systems, and more particularly to techniques for processing data using such systems.

BACKGROUND

In many enterprise settings, users can submit requests related to issues experienced in connection with using one or more systems. However, conventional data processing approaches typically include resource-intensive and error-prone processes that are difficult to scale as the number of requests increases.

SUMMARY

Illustrative embodiments of the disclosure provide techniques for automatically processing user request data using artificial intelligence techniques. An exemplary computer-implemented method includes generating, using at least one chatbot during a communication session with a user, one or more answers to one or more user requests by processing at least a portion of the one or more user requests using a first set of one or more artificial intelligence techniques associated with the at least one chatbot. The method also includes generating one or more knowledge base-related predictions associated with the one or more user requests by processing at least a portion of the one or more user requests using a second set of one or more artificial intelligence techniques associated with at least one knowledge base. Additionally, the method includes calculating at least one score associated with at least a portion of the one or more answers and the one or more user requests based at least in part on one or more qualifying values computed in connection with at least one of generating the one or more answers using the first set of one or more artificial intelligence techniques and generating the one or more knowledge base-related predictions using the second set of one or more artificial intelligence techniques. Further, the method also includes performing one or more automated actions based at least in part on the at least one calculated score. Illustrative embodiments can provide significant advantages relative to conventional data management approaches. For example, problems associated with resource-intensive and error-prone processes are overcome in one or more embodiments through automatically processing user request data using artificial intelligence techniques in conjunction with chatbot communication sessions.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
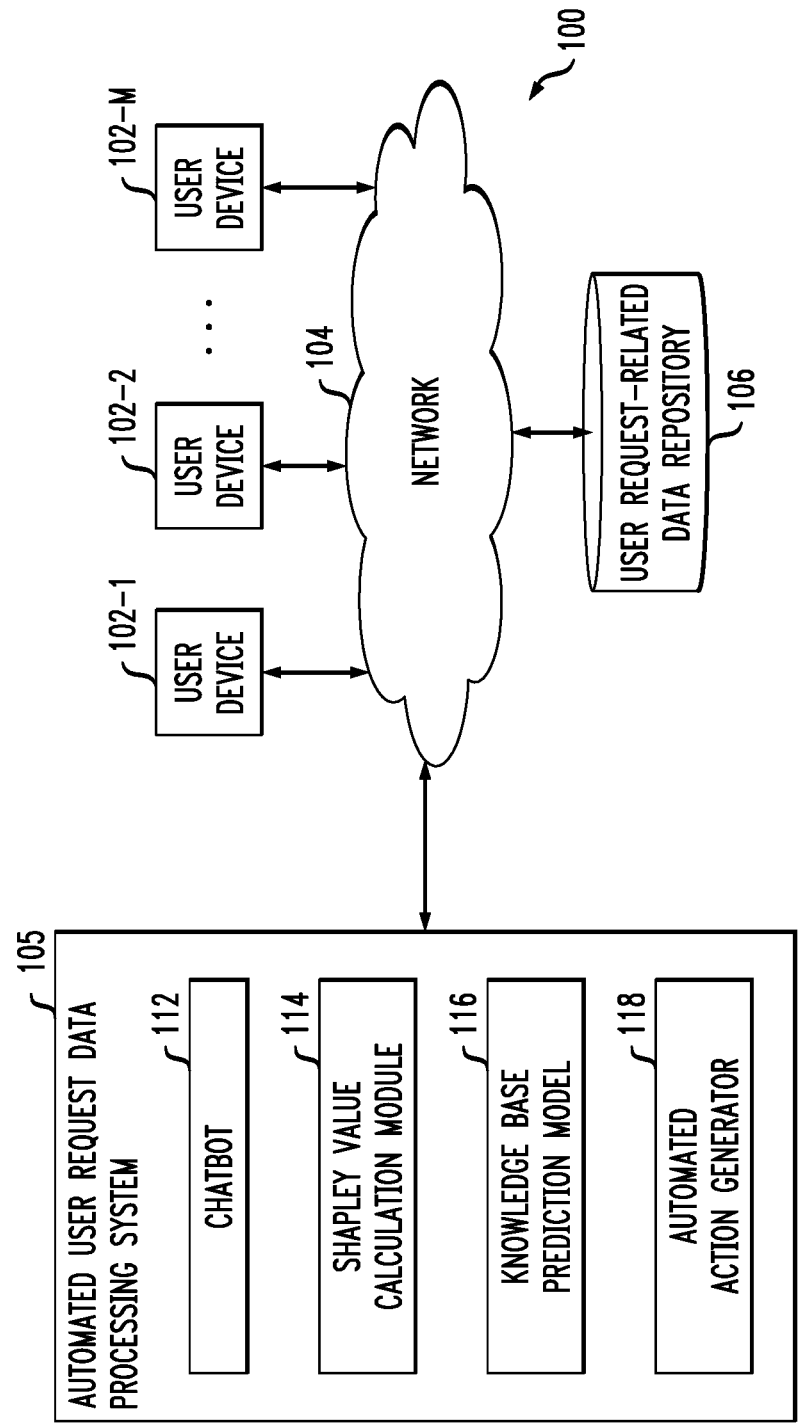
FIG. 1 shows an information processing system configured for automatically processing user request data using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated user request data processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated user request data processing system 105 can have an associated user request-related data repository 106 configured to store data pertaining to user requests, chatbot-generated answers, knowledge base predictions, etc. User requests, as used herein, are intended to be to be broadly construed as questions or other types of queries.

The user request-related data repository 106 in the present embodiment is implemented using one or more storage systems associated with automated user request data processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated user request data processing system 105 are one or more input-output devices, which illustratively comprise keyboards, displays or other types of input-output devices in any combination. Such input-output devices can be used, for example, to support one or more user interfaces to automated user request data processing system 105, as well as to support communication between automated user request data processing system 105 and other related systems and devices not explicitly shown.

Additionally, automated user request data processing system 105 in the FIG. 1 embodiment is assumed to be implemented using at least one processing device. Each such processing device generally comprises at least one processor and an associated memory, and implements one or more functional modules for controlling certain features of automated user request data processing system 105.

More particularly, automated user request data processing system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated user request data processing system 105 to communicate over the network 104 with the user devices 102, and illustratively comprises one or more conventional transceivers.

The automated user request data processing system 105 further comprises chatbot 112, Shapley value calculation module 114, knowledge base prediction model 116, and automated action generator 118.

It is to be appreciated that this particular arrangement of elements 112, 114, 116 and 118 illustrated in the automated user request data processing system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically processing user request data using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated user request data processing system 105 and user request-related data repository 106 can be on and/or part of the same processing platform.

An exemplary process utilizing elements 112, 114, 116 and 118 of an example automated user request data processing system 105 in computer network 100 will be described in more detail with reference to the flow diagram of FIG. 6.

Accordingly, at least one embodiment includes generating and/or implementing a user request processing system including an alert module, a summary module and a collaborative computing framework. In such an embodiment, as few as one human agent can simultaneously communicate with multiple users. For example, in such an embodiment, a user can initially, via the system, communicate with at least one avatar. In such an embodiment, an answer for a question is first generated using a chatbot engine, then the generated answer (e.g., in text or audio) is used to drive an avatar's head pose and lip movement to represent the avatar speaking the answer. Subsequently, if the system determines that one or more automatically generated replies, in connection with the avatar-based communication, is not sufficient, such an embodiment can include automatically transitioning the user to a human-based communication session and generate and output an alert to the corresponding human agent.

As further detailed herein, one or more embodiments include generating and/or implementing a framework which combines chatbot design, one or more confidence calculations, and one or more speech-to-avatar components to form a scalable end-to-end solution for processing user request data. For example, such an embodiment can include implementing an alert module associated with one or more confidence calculations related to user requests, wherein SHAP values and natural language processing (NLP) metrics are used to calculate alert scores. As used herein, a Shapley value represents a solution concept in connection with cooperative game theory (for example, the average marginal contribution of a feature value (e.g., one player) across all possible combinations and/or coalitions in a given environment).

One or more embodiments also include implementing a summary generation process for human agents, wherein the human agents can assume control of at least one avatar and correspondingly be provided with a summary of the avatar-user interaction and/or communication. Such an embodiment can include adapting one or more SHAP values and utilizing such values in connection with a knowledge base (KB) prediction module to generate and output a comprehensive summary to human agents.

Also, at least one embodiment includes implementing a collaborative computing framework to connect one or more edge devices and one or more cloud devices. In such an embodiment, at least one learning strategy (e.g., an online learning strategy which can include a retraining process with a new dataset) can be carried out in connection with such a framework to improve (e.g., continuously improve) performance on one or more such edge devices.

Further, as additionally detailed herein, one or more embodiments include generating and/or implementing a chatbot-human handoff framework in connection with processing user request data. As depicted in FIG. 1 and further illustrated herein, such a framework can include utilizing at least one chatbot (e.g., an automated communication exchange program), at least one Shapley value calculation module and approximator, and at least one KB prediction module.

Figure 2:
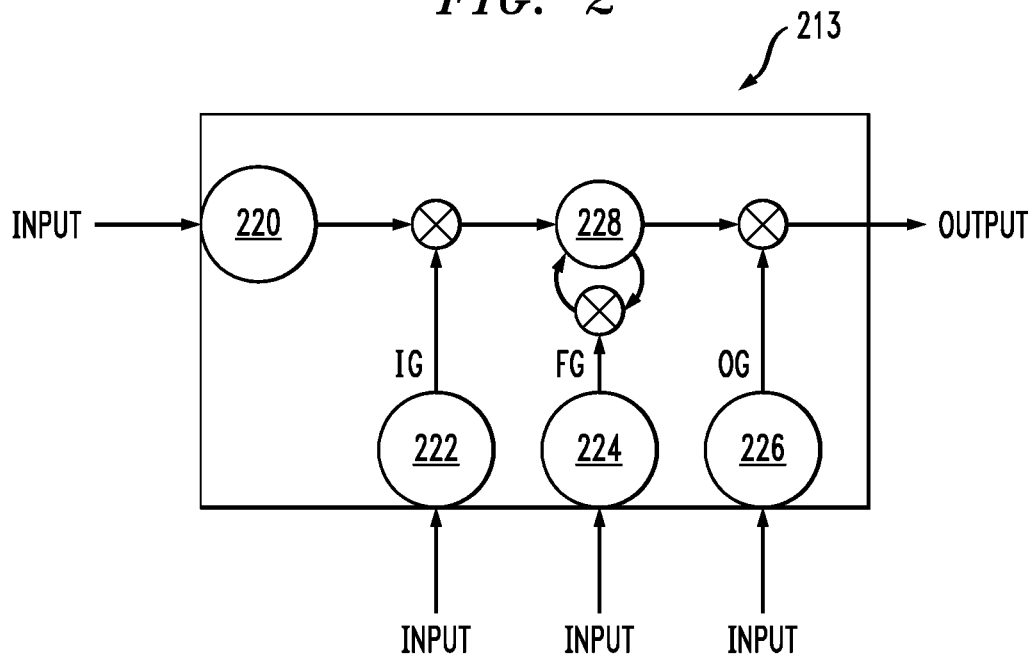
FIG. 2 shows an example long short-term memory (LSTM) neural network in an illustrative embodiment.

FIG. 2 shows an example LSTM neural network in an illustrative embodiment. As detailed in the FIG. 2 example, one or more embodiments include using at least one chatbot implementing sequence-to-sequence learning with a LSTM neural network 213 to generate communication entries (e.g., answers to user questions). Referring to the example depicted in FIG. 2, the LSTM neural network 213, implementing a given function 220 (e.g., a hyperbolic tangent function), a sigmoid function 228, as well as various multiplication operations (as depicted via the circled "X" elements), can overcome, for example, a vanishing gradient problem by employing multiplicative gates that enforce constant error flow through the internal states of special units referred to as memory cells. As depicted in FIG. 2, the input gate (IG) 222, output gate (OG) 226, and forget gate (FG) 224 prevent memory contents from being perturbed by irrelevant inputs and outputs, thereby allowing for long term memory storage. Additionally, in such an example LSTM neural network 213, the noted inputs provided to and/or processed by function 220, IG 222, FG 224 and OG 224 can include inputs associated with two or more temporal instances (e.g., two or more sequential temporal instances). Accordingly, because of the ability to learn long-term correlations in a sequence, the LSTM neural network 213 obviates the need for a pre-specified time window and is capable of accurately modeling complex multivariate sequences.

In connection with an example LSTM neural network such as depicted in FIG. 2, one or more embodiments can include implementation of the following steps. Input data is cleaned, for example, by removing certain predetermined words and/or terms (e.g., @mentions, etc.) from request data as well as images from request data. Subsequently, the cleaned data is tokenized and a vocabulary of the most frequently used words in the conversation(s) is built. Additionally, based at least in part on the tokenized data, one or more word embedding features (e.g., vectors) can be generated and used, in part, to train one or more NLP techniques (e.g., one or more word2vec models). In at least one embodiment, each word in the above-noted built vocabulary can be represented as a 640-dimension vector. Further, one or more embodiments include training one or more LSTM neural networks. In such an embodiment, the input and output of LSTM neural networks are vector representations of word sequences, with one word encoded or decoded at a time. By way merely of example, at least one embodiment can include training deep LSTM neural networks jointly with multiple layers (e.g., five layers)×640 memory cells using stochastic gradient descent and gradient clipping techniques (e.g., to trim the derivative of a loss with respect to the network inputs to the LSTM layers (before the sigmoid and tanh functions are applied) to be within a preset range).

As noted above and further detailed herein, one or more embodiments include using Shapley values and their weighted least squares characterization. By way of illustration, let $x \in \mathcal{X}$ be a random vector including d features, or $x=(x_1, \ldots, x_d)$, and let $y \in Y=\{1, \ldots, K\}$ be the response variable for a classification problem, wherein $\mathcal{X}$ represents one or more features, Y represents one or more labels, and K represents concrete labels (e.g., 1, 2, 3, . . . , k). Also, at least one embodiment can include using $s \in \{0, 1\}d$ to denote subsets of the indices $\{1, \ldots, d\}$, and defining $x_s := \{x_i\}_{i:s_i=1}$, wherein i represents the $i^{th}$ element. As used in this context, the symbols x, y, s are random variables and x, y, s denote possible values. Additionally, such equations use 1 and 0 to denote vectors of ones and zeros in $\mathbb{R}^d$, such that $1^T s$ is a subset's cardinality, wherein R represents one or more real numbers, and wherein $1^T s$ represents a vector containing 1s. Further, $e_i$ is used to denote the $i^{th}$ standard basis vector. Further, as used in one or more embodiments, $f(x; \eta):X \mapsto \Delta^{K-1}$ is a model that outputs a probability distribution over y given x, and $f_y(x; \eta)$ is the probability for the $y^{th}$ class, wherein q represents one or more model parameters wherein model f is conditioned on such parameters.

As also detailed herein, in connection with one or more embodiments, Shapley values can be utilized as a credit allocation technique in cooperative game theory, and can also be utilized to explain predictions from black-box machine learning models. For example, for any value function (or set function) $v=2^d \mapsto \mathbb{R}$, the Shapley values $\phi(v) \in \mathbb{R}^d$, or $\phi_i(v) \in \mathbb{R}$ for each feature $i=1, \ldots, d$, are given by Equation (1) below:

$$\phi_i(v) = \frac{1}{d}\sum_{s_i \neq 1}\binom{d-1}{1^T s}^{-1}(v(s+e_i) - v(s)) \qquad (1)$$

The difference $v(s+e_i)-v(s)$ represents the $i^{th}$ feature's contribution to the subset s, and the summation represents a weighted average across all subsets that do not include i. In the model explanation context, the value function is chosen to represent how an individual prediction varies as different subsets of features are removed. For example, given an input-output pair (x,y), the prediction for the $y^{th}$ class can be represented by a value function $v_{x,y}$ defined by Equation (2) below:

$$v_{x,y}(s) = \text{link}\left(\mathop{\mathbb{E}}_{p(x_{1-s})}[f_y(x_z, x_{1-s}; \eta)]\right) \qquad (2)$$

wherein the held-out features $x_{1-s}$ are marginalized out using their joint marginal distribution $p(x_{1-s})$, and a link function (e.g., logit) is applied to the model output, wherein p represents distribution and $\mathbb{E}$ represents expectation. Regardless of the formulation, such an $\mathbb{E}$ approach to model explanation includes multiple useful properties based at least in part on the use of Shapley values. For example, the attributions are zero for irrelevant features, and they are guaranteed to sum to the model's prediction.

Additionally, in one or more embodiments, at least one Shapley value implementation technique (e.g., KernelSHAP) can be implemented which, for example, relies on an alternative Shapley value interpretation. Given a value function $v_{x,y}(s)$, Equation (1) above shows that the values $\phi(v_{x,y})$ are the features' weighted average contributions; equivalently, their weighted least squares characterization indicates that those values are the solution to an optimization problem over $\phi_{x,y} \in \mathbb{R}^d$, given by Equation (3) below:

$$\phi(v_{x,y}) = \arg\min_{\phi_{x,y}} \mathbb{E}_{p(s)} \left[ \left( v_{x,y}(s) - v_{x,y}(0) - s^T \phi_{x_i y} \right)^2 \right] \quad (3)$$

such that $1^T \phi_{x,y} = v_{x,y}(1) - v_{x,y}(0)$, wherein the distribution $p(s)$ is defined as and/or referred to a Shapley kernel for s such that $0 < 1^T s < d$. Based at least in part on this view of the Shapley value, KernelSHAP represents a stochastic estimator that solves an approximate version of Equation (3) given some number of subsets sampled from $p(s)$. Although such an estimator is consistent and empirically unbiased, KernelSHAP can require a plurality of samples to achieve an accurate estimate, and can also include solving Equation (3) separately for each input-output pair (x,y). Accordingly, at least one embodiment includes modifying KernelSHAP techniques, leveraging the weighted least squares characterization of one or more Shapley values to improve and/or enhance the estimation(s).

For example, one or more embodiments include using bidirectional encoder representations from transformers (BERT), which can encompass a wide variety of NLP tasks (e.g., text classification). Such an embodiment includes applying the bidirectional training of at least one transformer (an example of an attention model) to language modelling, and fine-tuning the language model to one or more specific tasks. By way merely of illustration, at least one example embodiment includes using BERT in connection with at least one KB predictor to intelligently assign data, as further detailed herein.

Figure 3:
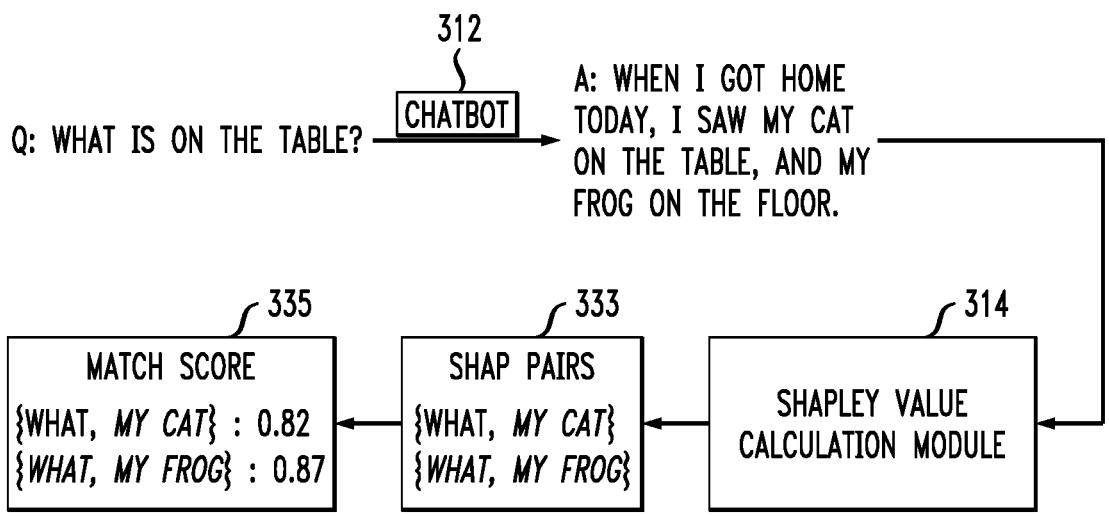
FIG. 3 shows an example alert score calculation process using Shapley additive explanation (SHAP) values in an illustrative embodiment.

FIG. 3 shows an example alert score calculation process using Shapley values in an illustrative embodiment. By way of illustration, FIG. 3 depicts using chatbot 312 to generate an answer (e.g., "When I got home today, I saw my cat on the table, and my frog on the floor") to a user-provided question (e.g., "What is on the table"). FIG. 3 then depicts using Shapley value calculation module 314 generate Shapley values, based at least in part on the answer generated by the chatbot 312, which can explain the starting range predictions of the model (e.g., any classification model incorporating the techniques detailed herein). Note that because the model output depends on the length of the model input, one or more embodiments can include passing the model's native tokenizer for masking, such that when portions of the text are hidden, the same number of tokens and, hence, the same meaning for each output position, can be retained.

Additionally, based on the Shapley values Si for each token, the top tokens for both answers and questions can be selected as given by Equation (4) below:

$$T_{ans} = \operatorname*{Argmax}_{i \in Token_{ans}} S_i; \; T_{que} = \operatorname*{Argmax}_{j \in Token_{que}} S_j \quad (4)$$

wherein, Token$_{ans}$ refers to the tokens in answers and Token$_{que}$ refers to the tokens in questions. Further, as depicted in FIG. 3, SHAP pairs 333 are generated and/or determined by combine tokens from $T_{ans}$ and $T_{que}$. For each pair, a match score M 335 is calculated (e.g., using cosine similarity) as given by Equation (5) below:

$$M = \Sigma_{i \in T_{ans}} \Sigma_{j \in T_{que}} dis(i,j) \quad (5)$$

wherein dis(i,j) calculates similarity using cosine similarity (e.g., wherein "my cat" and "my frog" are related to "what," resulting in a relatively high match score). In one or more embodiments, this match score 335 serves as an alert score. Further, in such an embodiment, if the alert score is higher than a given and/or predetermined threshold value, a corresponding alert will be automatically sent to at least one human agent, for example, the user interaction and/or communication can be transitioned to the at least one human agent.

Once a human agent joins the user interaction and/or communication, the human agent preferably needs to obtain context information regarding the history of the user interaction and/or communication (e.g., the conversation between the user and the chatbot prior to transitioning to the human agent). Accordingly, one or more embodiments include automatically generating a summary of the user-chatbot interaction and/or communication including one or more types of context information based at least in part on the questions and one or more KB predictions.

Figure 4:
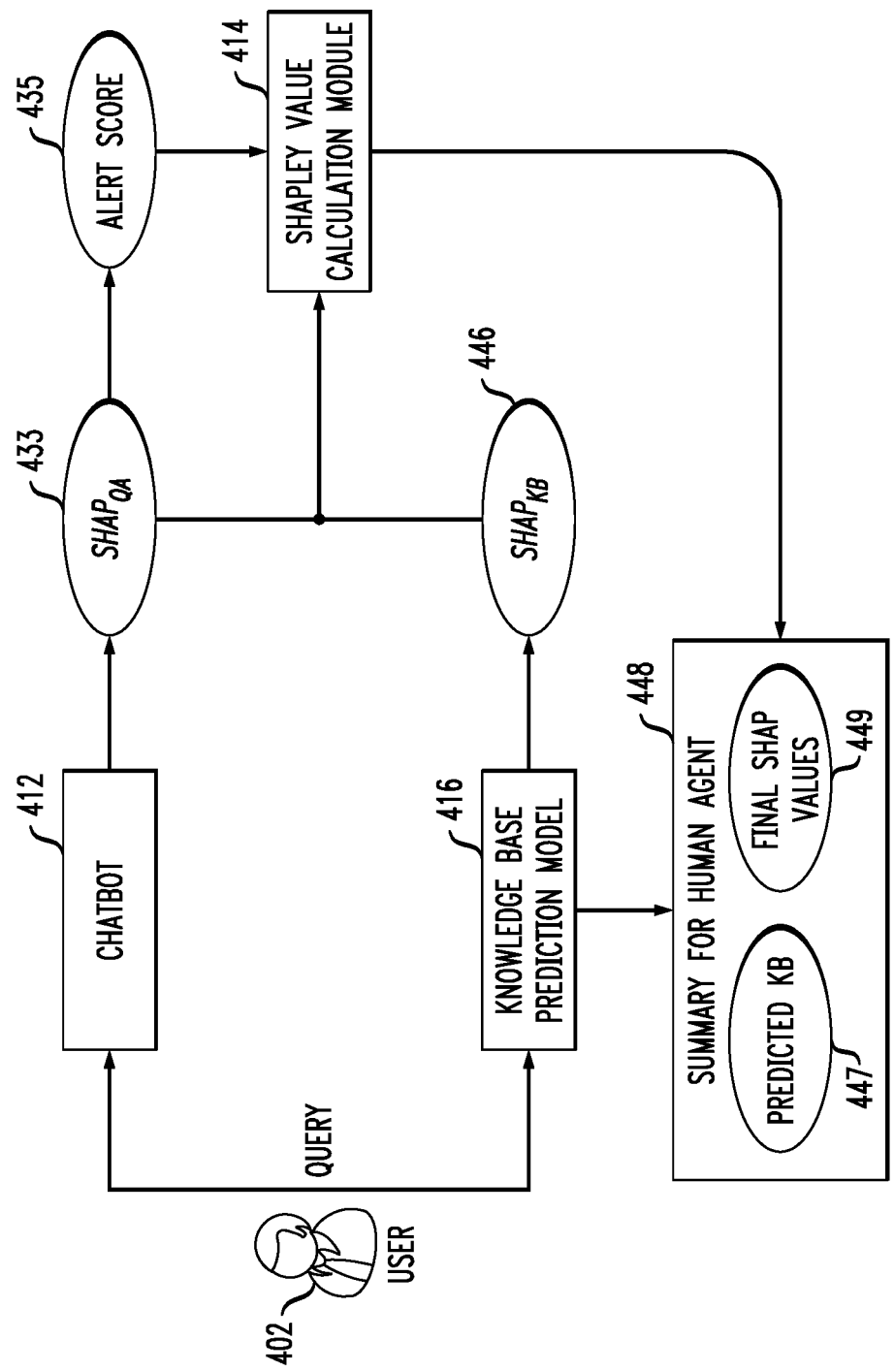
FIG. 4 shows a summary generation process in an illustrative embodiment.

FIG. 4 shows a summary generation process in an illustrative embodiment. By way of illustration, FIG. 4 depicts user 402 submitting a query, which is processed by chatbot 412 as well as KB prediction model 416. Chatbot 412, based at least in part on processing the query and determining one or more answers, generates corresponding Shapley pairs (SHAP$_{QA}$) 433 which are used to generate alert score 435.

As also depicted in FIG. 4, the KB prediction module 416, based at least in part on the query, generates one or more Shapley KB values (SHAP$_{KB}$) 446. In at least one embodiment, the KB prediction module 416 generates Shapley KB values by processing an input question using at least one classification model (e.g., BERT) and outputting the KB values. Accordingly, in such an embodiment, the KB prediction module 416 uses BERT to predict at least one KB number 447 (e.g., including context information), which is then used in generating the final SHAP values 449 of the summary 448. With respect to the above-noted KB number 447, in one or more embodiments, each user query can be associated with a related KB, which can provide guidance for further processing. Additionally, Shapley pairs 433, alert score 436, and Shapley KB values 446 are used to perform a confidence-aware Shapley value calculation in via Shapley value calculation module 414, wherein the confidence output is also used in generating the summary 448 for the at least one human agent. For example, in one or more embodiments, such output and/or scores can be visualized (e.g., color-coded), highlighting the most important words for the at least one human agent.

In accordance with one or more embodiments, model selection can include considering and/or utilizing multiple architectures of models pretrained on different corpus. At least one example embodiment includes selecting and implementing a BERT base model including multiple stacked encoders (e.g., 12 stacked encoders) such as depicted, for example, in FIG. 5. Such a BERT base model can be pretrained, for example, using masked language modeling (MLM) and next sentence prediction (NSP) techniques using uncased Wiki and book corpus.

Such an embodiment can additionally include building a masked language model to learn the feature representation for one or more requests. The language style in a given corpus associated with this task can differ from the corpus initially used for pretraining the BERT base model (e.g., Wiki and book corpus), and as such, one or more embodiments include fine-tuning the BERT base model on the given corpus associated with building the masked language model (e.g., a technical corpus such as SRTrain) via an MLM task and generating and/or deriving a new language model (e.g., BERTSR).

Additionally, such an embodiment includes building at least one supervised classifier based at least in part on the feature representation learned by the new language model (e.g., BERTSR) by fine-tuning the model (e.g., using LSR-TRAIN) by adding a classification layer on top of the transformer output for a classification token (also referred to herein as a [CLS] token). Additionally or alternatively, in at least one embodiment, the classification layer can be packaged into an application programming interface (API) of at least one BERT, and the at least one BERT can generate the [CLS] token and use the LSRTRAIN strategy to retrain the model.

Referring again to FIG. 4, confidence-aware Shapley value calculations can be carried out by Shapley value calculation module 414. For example, in one or more embodiments, and as depicted in FIG. 4, SHAP values are calculated in connection with both the chatbot 412 (SHAP$_{QA}$ 433) and the KB prediction model 416 (SHAP$_{KB}$ 446). Additionally, such an embodiment also utilizes the alert score M 435 (generated based at least in part on SHAP$_{QA}$ 433) in calculating one or more final SHAP values 449, for example, using the following formula:

$$SHAP = \frac{SHAP_{QA}}{M} + SHAP_{KB}$$

Further, one or more embodiments can include generating and/or outputting the summary for the human agent(s) 448 by displaying one or more of the submitted questions and corresponding answers based at least in part on the calculated final SHAP value(s) 449.

Figure 5:
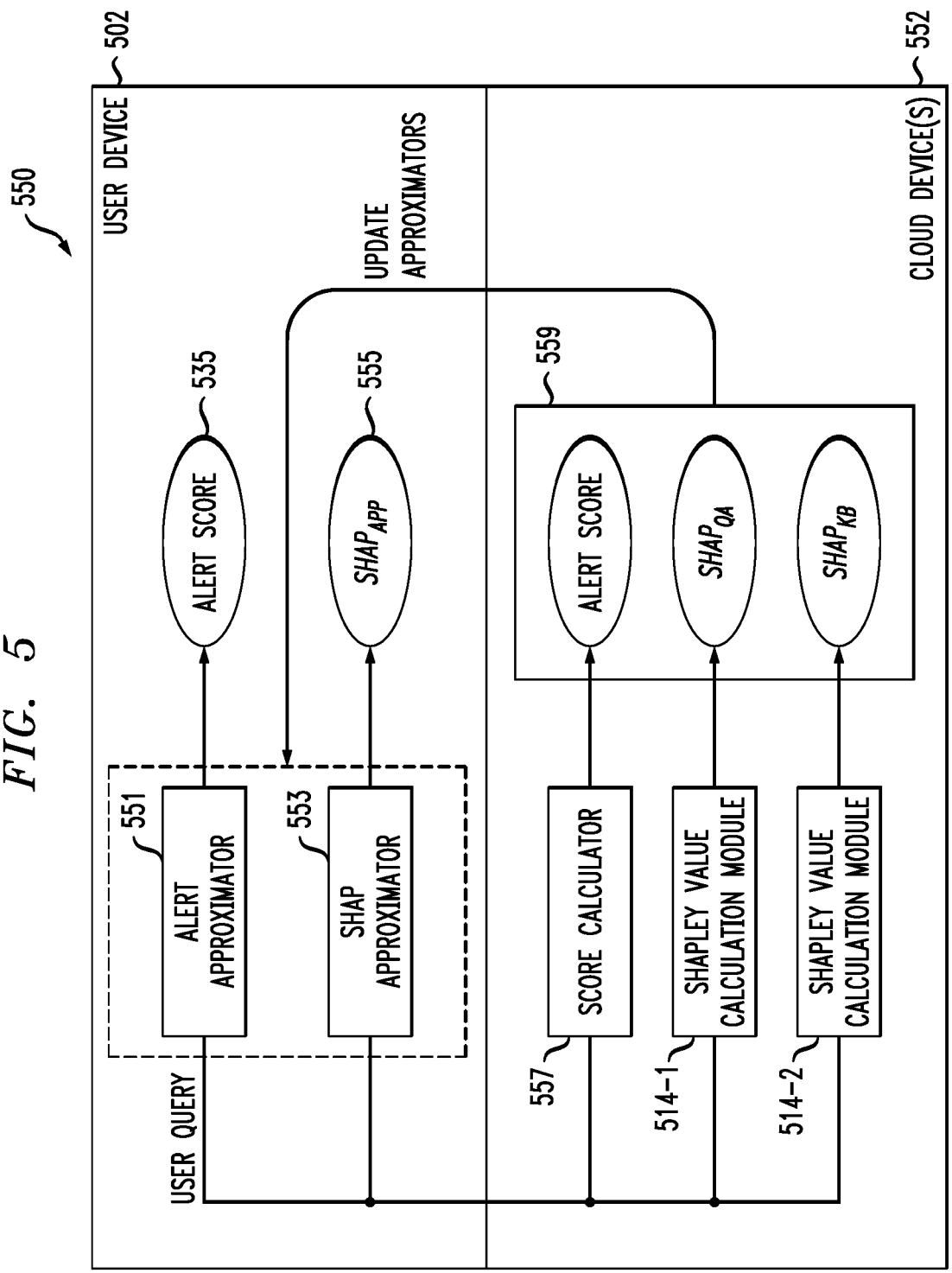
FIG. 5 shows an example collaborative computing framework in an illustrative embodiment.

FIG. 5 shows an example collaborative computing framework in an illustrative embodiment. By way of illustration, FIG. 5 depicts a collaborative computing framework 550 which enables edge devices, such as user device 502, to perform avatar-based request data processing. More specifically, on an edge device such as user device 502, at least one embodiment includes using one or more cloud devices 552 to train a SHAP approximator 553 and an alert approximator 551 using one or more similar metrics (e.g., a cosine similarity metric), and these approximators (551 and 553) generate approximated values (alert score 535 and SHAP$_{APP}$ 555, respectively) which are used to provide an initial and/or quick justification for at least part of a user-chatbot interaction and/or communication during a conversation being carried out in connection with the edge device (user device 502).

However, as also depicted in FIG. 5, one or more embodiments can include implementing techniques to improve performance of chatbots, which can include using a set of values 559, including an alert score, SHAP$_{QA}$ values, and SHAP$_{KB}$ values, separately generated by one or more cloud devices 552 (using score calculator 557 and Shapley value calculation modules 514-1 and 514-2, respectively), to update and/or further train the SHAP approximator 553 and alert score approximator 551 on user device 502.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 6:
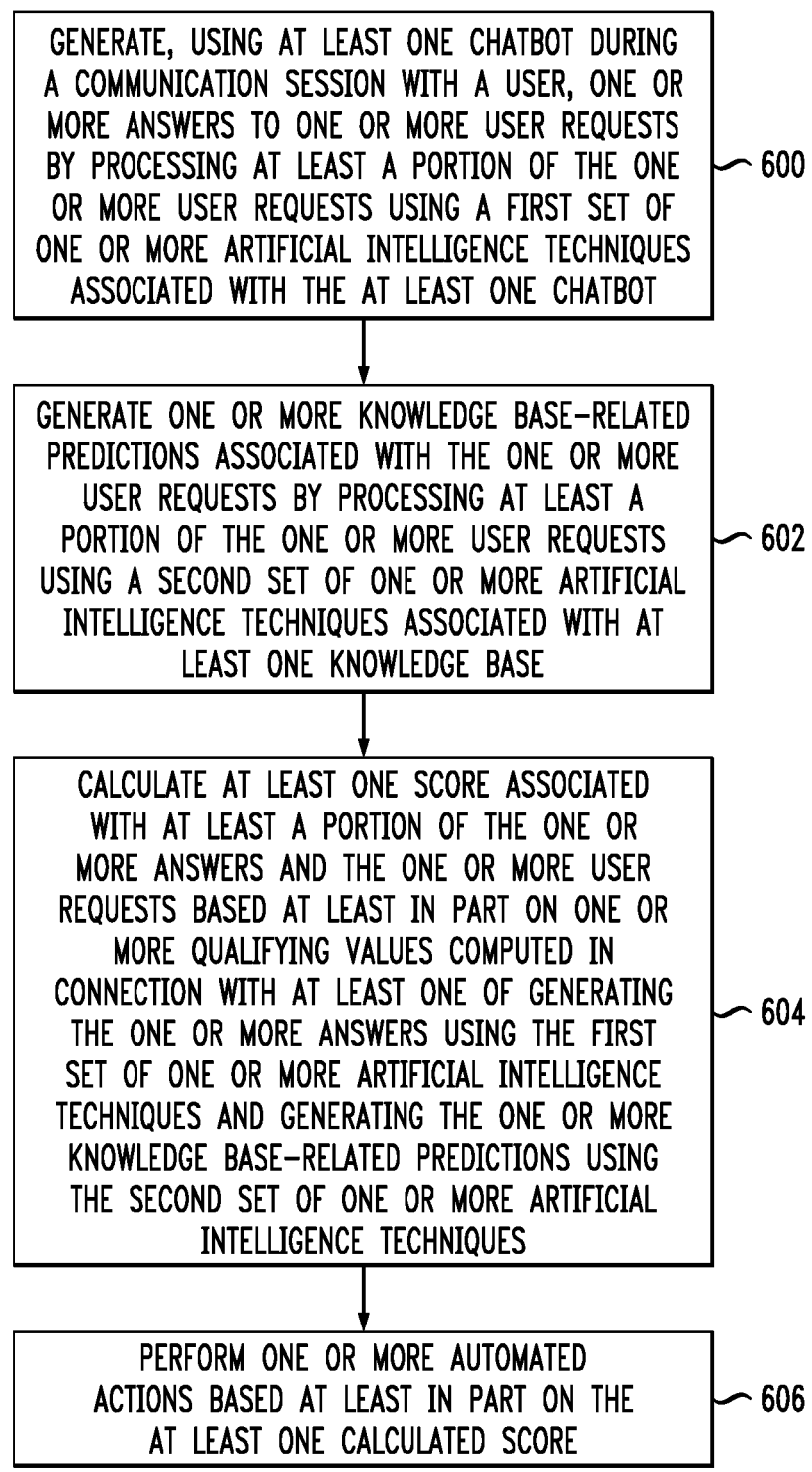
FIG. 6 is a flow diagram of a process for automatically processing user request data using artificial intelligence techniques in an illustrative embodiment.

FIG. 6 is a flow diagram of a process for automatically processing user request data using artificial intelligence techniques in an illustrative embodiment. It is to be understood that this particular process is only an example, and additional or alternative processes can be carried out in other embodiments.

In this embodiment, the process includes steps 600 through 606. These steps are assumed to be performed by the automated user request data processing system 105 utilizing elements 112, 114, 116 and 118.

Step 600 includes generating, using at least one chatbot during a communication session with a user, one or more answers to one or more user requests by processing at least a portion of the one or more user requests using a first set of one or more artificial intelligence techniques associated with the at least one chatbot. In at least one embodiment, processing at least a portion of the one or more user requests using the first set of one or more artificial intelligence techniques includes processing at least a portion of the one or more user requests using one or more sequence-to-sequence learning techniques via implementation of at least one long short-term memory neural network associated with the at least one chatbot. Additionally or alternatively, processing at least a portion of the one or more user requests using the first set of one or more artificial intelligence techniques can include processing at least a portion of the one or more user requests using one or more natural language processing techniques.

Step 602 includes generating one or more knowledge base-related predictions associated with the one or more user requests by processing at least a portion of the one or more user requests using a second set of one or more artificial intelligence techniques associated with at least one knowledge base. In one or more embodiments, Step 604 includes calculating at least one score associated with at least a portion of the one or more answers and the one or more user requests based at least in part on one or more qualifying values computed in connection with at least one of generating the one or more answers using the first set of one or more artificial intelligence techniques and generating the one or more knowledge base-related predictions using the second set of one or more artificial intelligence techniques. In at least one embodiment, the one or more qualifying values include one or more Shapley values computed in connection with at least one of generating the one or more answers using the first set of one or more artificial intelligence techniques and generating the one or more knowledge base-related predictions using the second set of one or more artificial intelligence techniques. Such an embodiment can also include modifying the one or more Shapley values by leveraging at least one weighted least squares characterization of the one or more Shapley values. Additionally or alternatively, in such an embodiment, calculating at least one score associated with at least a portion of the one or more answers and the one or more user requests can include using one or more similarity techniques in connection with the one or more Shapley values.

Also, in at least one embodiment, processing at least a portion of the one or more user requests using the second set of one or more artificial intelligence techniques includes processing at least a portion of the one or more user requests using one or more bidirectional encoder representations from transformers associated with the at least one knowledge base.

Step 606 includes performing one or more automated actions based at least in part on the at least one calculated score. In one or more embodiments, performing one or more automated actions includes automatically transitioning the communication session from the at least one chatbot to at least one human agent based at least in part on the at least one calculated score in relation to at least one predetermined threshold value. In such an embodiment, performing one or more automated actions can include automatically generating, and outputting to the at least one human agent, a summary of the communication session prior to the transitioning, wherein the summary comprises at least a portion of the one or more knowledge base-related predictions and at least a portion of the one or more qualifying values.

Further, in one or more embodiments, performing one or more automated actions includes automatically training, using feedback related to the at least one calculated score, at least one of the first set of one or more artificial intelligence techniques and the second set of one or more artificial intelligence techniques. Additionally, as detailed herein, the techniques depicted in FIG. 6 can be performed by a user device associated with the user in connection with one or more cloud devices.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically process user request data using artificial intelligence techniques in conjunction with one or more chatbot communication sessions. These and other embodiments can effectively overcome problems associated with resource-intensive and error-prone processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
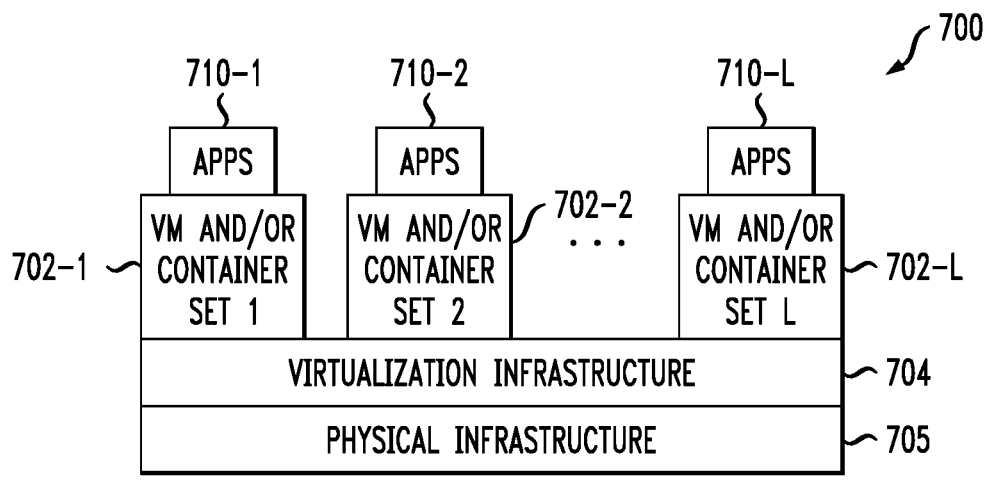
FIGS. 7 and 8 show examples of processing platforms that may be utilized to implement at least a portion of an information processing system in illustrative embodiments.
Figure 8:
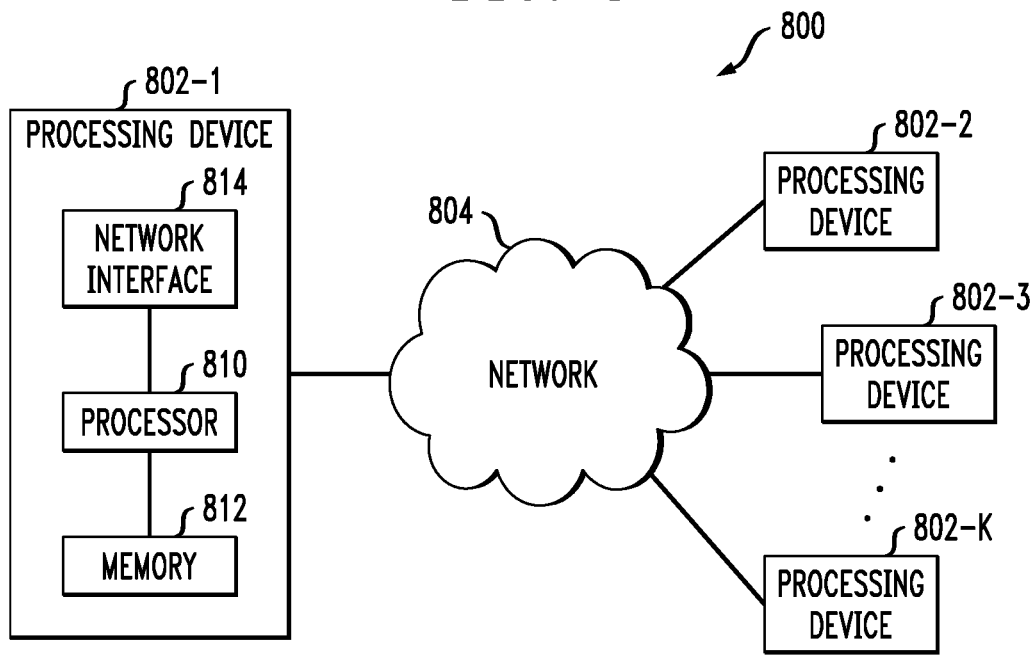

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs)

and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more information processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating, using at least one chatbot during a communication session with a user, one or more answers to one or more user requests by processing at least a portion of the one or more user requests using a first set of one or more artificial intelligence techniques associated with the at least one chatbot;
generating one or more knowledge base-related predictions associated with the one or more user requests by processing at least a portion of the one or more user requests using a second set of one or more artificial intelligence techniques associated with at least one knowledge base;
calculating at least one score associated with at least a portion of the one or more answers and the one or more user requests based at least in part on one or more qualifying values computed in connection with at least one of generating the one or more answers using the first set of one or more artificial intelligence techniques and generating the one or more knowledge base-related predictions using the second set of one or more artificial intelligence techniques, wherein the one or more qualifying values comprise one or more Shapley values attributed to at least a portion of at least one of the one or more answers and the one or more user requests, the one or more Shapley values computed in connection with at least one of generating the one or more answers using the first set of one or more artificial intelligence techniques and generating the one or more knowledge base-related predictions using the second set of one or more artificial intelligence techniques; and
performing one or more automated actions based at least in part on the at least one calculated score;
wherein the method is performed by at least one processing device comprising a processor coupled to a memory.

2. The computer-implemented method of claim 1, wherein performing one or more automated actions comprises automatically transitioning the communication session from the at least one chatbot to at least one human agent based at least in part on the at least one calculated score in relation to at least one predetermined threshold value.

3. The computer-implemented method of claim 2, wherein performing one or more automated actions comprises automatically generating, and outputting to the at least one human agent, a summary of the communication session prior to the transitioning, wherein the summary comprises at least a portion of the one or more knowledge base-related predictions and at least a portion of the one or more qualifying values.

4. The computer-implemented method of claim 1, further comprising:
modifying the one or more Shapley values by leveraging at least one weighted least squares characterization of the one or more Shapley values.

5. The computer-implemented method of claim 1, wherein calculating at least one score associated with at least a portion of the one or more answers and the one or more user requests comprises using one or more similarity techniques in connection with the one or more Shapley values.

6. The computer-implemented method of claim 1, wherein processing at least a portion of the one or more user requests using the first set of one or more artificial intelligence techniques comprises processing at least a portion of the one or more user requests using one or more sequence-to-sequence learning techniques via implementation of at least one long short-term memory neural network associated with the at least one chatbot.

7. The computer-implemented method of claim 1, wherein processing at least a portion of the one or more user requests using the first set of one or more artificial intelligence techniques comprises processing at least a portion of the one or more user requests using one or more natural language processing techniques.

8. The computer-implemented method of claim 1, wherein processing at least a portion of the one or more user requests using the second set of one or more artificial intelligence techniques comprises processing at least a portion of the one or more user requests using one or more bidirectional encoder representations from transformers associated with the at least one knowledge base.

9. The computer-implemented method of claim 1, wherein performing one or more automated actions comprises automatically training, using feedback related to the at least one calculated score, at least one of the first set of one or more artificial intelligence techniques and the second set of one or more artificial intelligence techniques.

10. The computer-implemented method of claim 1, wherein the method is performed by a user device associated with the user in connection with one or more cloud devices.

11. A non-transitory processor-readable storage medium having stored therein program code of one or more software programs, wherein the program code when executed by at least one processing device causes the at least one processing device:
to generate, using at least one chatbot during a communication session with a user, one or more answers to one or more user requests by processing at least a portion of the one or more user requests using a first set of one or more artificial intelligence techniques associated with the at least one chatbot;
to generate one or more knowledge base-related predictions associated with the one or more user requests by processing at least a portion of the one or more user requests using a second set of one or more artificial intelligence techniques associated with at least one knowledge base;
to calculate at least one score associated with at least a portion of the one or more answers and the one or more user requests based at least in part on one or more qualifying values computed in connection with at least one of generating the one or more answers using the first set of one or more artificial intelligence techniques and generating the one or more knowledge base-related predictions using the second set of one or more artificial intelligence techniques, wherein the one or more qualifying values comprise one or more Shapley values attributed to at least a portion of at least one of the one or more answers and the one or more user requests, the one or more Shapley values computed in connection with at least one of generating the one or more answers using the first set of one or more artificial intelligence techniques and generating the one or more knowledge base-related predictions using the second set of one or more artificial intelligence techniques; and
to perform one or more automated actions based at least in part on the at least one calculated score.

12. The non-transitory processor-readable storage medium of claim 11, wherein performing one or more automated actions comprises automatically transitioning the communication session from the at least one chatbot to at least one human agent based at least in part on the at least one calculated score in relation to at least one predetermined threshold value.

13. The non-transitory processor-readable storage medium of claim 12, wherein performing one or more automated actions comprises automatically generating, and outputting to the at least one human agent, a summary of the communication session prior to the transitioning, wherein the summary comprises at least a portion of the one or more knowledge base-related predictions and at least a portion of the one or more qualifying values.

14. The non-transitory processor-readable storage medium of claim 11, wherein processing at least a portion of the one or more user requests using the first set of one or more artificial intelligence techniques comprises processing at least a portion of the one or more user requests using one or more sequence-to-sequence learning techniques via implementation of at least one long short-term memory neural network associated with the at least one chatbot.

15. An apparatus comprising:
at least one processing device comprising a processor coupled to a memory;
the at least one processing device being configured:
to generate, using at least one chatbot during a communication session with a user, one or more answers to one or more user requests by processing at least a portion of the one or more user requests using a first set of one or more artificial intelligence techniques associated with the at least one chatbot;
to generate one or more knowledge base-related predictions associated with the one or more user requests by processing at least a portion of the one or more user requests using a second set of one or more artificial intelligence techniques associated with at least one knowledge base;
to calculate at least one score associated with at least a portion of the one or more answers and the one or more user requests based at least in part on one or more qualifying values computed in connection with at least one of generating the one or more answers using the first set of one or more artificial intelligence techniques and generating the one or more knowledge base-related predictions using the second set of one or more artificial intelligence techniques, wherein the one or more qualifying values comprise one or more Shapley values attributed to at least a portion of at least one of the one or more answers and the one or more user requests, the one or more Shapley values computed in connection with at least one of generating the one or more answers using the first set of one or more artificial intelligence techniques and generating the one or more knowledge base-related predictions using the second set of one or more artificial intelligence techniques; and
to perform one or more automated actions based at least in part on the at least one calculated score.

16. The apparatus of claim 15, wherein performing one or more automated actions comprises automatically transitioning the communication session from the at least one chatbot to at least one human agent based at least in part on the at least one calculated score in relation to at least one predetermined threshold value.

17. The apparatus of claim 16, wherein performing one or more automated actions comprises automatically generating, and outputting to the at least one human agent, a summary of the communication session prior to the transitioning, wherein the summary comprises at least a portion of the one or more knowledge base-related predictions and at least a portion of the one or more qualifying values.

18. The apparatus of claim 15, wherein the at least one processing device being further configured:
to modify the one or more Shapley values by leveraging at least one weighted least squares characterization of the one or more Shapley values.

19. The apparatus of claim 15, wherein calculating at least one score associated with at least a portion of the one or more answers and the one or more user requests comprises using one or more similarity techniques in connection with the one or more Shapley values.

20. The apparatus of claim 15, wherein processing at least a portion of the one or more user requests using the first set of one or more artificial intelligence techniques comprises processing at least a portion of the one or more user requests using one or more sequence-to-sequence learning techniques via implementation of at least one long short-term memory neural network associated with the at least one chatbot.

* * * * *